United States Patent
Moorman et al.

(10) Patent No.: US 9,188,221 B2
(45) Date of Patent: Nov. 17, 2015

(54) ADAPTIVE CONTROL OF A FLOW CONTROL SOLENOID VALVE

(71) Applicant: GM GLOBAL TECHNOLOGY OPERATIONS LLC, Detroit, MI (US)

(72) Inventors: Steven P. Moorman, Dexter, MI (US); David H. Vu, East Lansing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 14/185,236

(22) Filed: Feb. 20, 2014

(65) Prior Publication Data

US 2015/0233469 A1 Aug. 20, 2015

(51) Int. Cl.
*G06F 17/00* (2006.01)
*F16H 61/06* (2006.01)
*F16H 61/04* (2006.01)

(52) U.S. Cl.
CPC ...... *F16H 61/061* (2013.01); *F16H 2061/0459* (2013.01); *F16H 2061/062* (2013.01)

(58) Field of Classification Search
None
See application file for complete search history.

(56) References Cited

U.S. PATENT DOCUMENTS

| 5,879,268 A * | 3/1999 | Yasue et al. | 477/143 |
| 8,577,565 B2 | 11/2013 | Nassouri et al. | |
| 8,843,289 B2 * | 9/2014 | Postic et al. | 701/68 |

* cited by examiner

*Primary Examiner* — Dirk Wright
(74) *Attorney, Agent, or Firm* — Quinn Law Group, PLLC

(57) ABSTRACT

A vehicle includes an engine, first clutch, transmission, and controller. The transmission includes a gearbox, position sensors, and a fluid circuit. The gearbox contains a second clutch. The fluid circuit includes a pump and a flow control solenoid valve. The controller opens the valve via flow control signals to allow fluid to pass into or from the particular clutch it feeds. The controller executes steps of a method to determine an actual flow rate through the valve as the clutch moves, and also calculates a compensation scale factor as a ratio of the commanded and actual flow rates. The controller modifies the flow control signals in a subsequent clutch actuation using the compensation scale factor, such as by multiplying a commanded flow rate corresponding to the flow control signals by the compensation scale factor. A system includes rotatable members connected by a clutch, the controller, valve, and position sensor.

18 Claims, 2 Drawing Sheets

ADAPTIVE CONTROL OF A FLOW CONTROL SOLENOID VALVE

TECHNICAL FIELD

The present disclosure relates to adaptive control of a flow control solenoid valve.

BACKGROUND

Hydraulic fluid circuits employ valves, pistons, and other various fluid powered components and flow control devices in order to perform useful work in a system. For example, a transmission typically employs hydraulic clutches having spaced friction plates. The friction plates are compressed via a clutch apply piston or a synchronizer fork by fluid pressure. When a fluid pump is running and/or a hydraulic accumulator is actively exhausting, fluid is delivered under pressure through any open branches of a fluid circuit. In a system having a clutch, for instance, a flow control valve may be selectively opened to allow the fluid to enter a clutch apply chamber for that particular clutch, thereby filling the clutch prior to clutch engagement.

SUMMARY

A vehicle is disclosed herein having a clutch and a flow control solenoid valve of the type noted above. The vehicle includes a controller that is programmed to learn the actual flow characteristics of the valve over time. Over time, the controller modifies flow control commands transmitted to the valve to thereby adapt to the changing performance of the valve, e.g., due to age, wear, temperature variations, and the like.

To accomplish these end goals, the controller may periodically update a series of lookup tables, each of which corresponds to a different measured temperature of the fluid used to actuate the clutch. The lookup tables are populated with commanded and actual flow rates. The commanded flow rate is a value that is available to the controller as part of its overall shift control logic, i.e., the particular flow rate needed for achieving a desired position of a clutch apply piston. The actual flow rate may be determined in various ways, including by calculating the actual flow rate as a function of measured clutch position and a surface area of a clutch apply piston of the clutch.

The controller may also calculate a compensation scale factor and include this factor in the lookup tables. The compensation scale factor may be derived by the controller by dividing the commanded flow rate by the actual flow rate at a given fluid temperature. The recorded compensation scale factor can be used in a future shift action involving the clutch, the valve for which the flow characteristics were learned, so as to yield an adapted commanded flow rate to be commanded at the next shift of the transmission using the same valve. The adapted commanded flow rate may be transmitted to the valve as a set of flow control signals, which in a solenoid valve embodiment are the electrical current commands required for energizing windings of the solenoid portion of the valve, as is well known in the art.

When used in this manner, the compensation scale factor helps to account for any differences that might be present between a generic flow vs. current (Q vs. i) characteristic table, typically provided by a valve supplier, and the actual performance of that particular valve. The use of multiple lookup tables to cover a number of different fluid temperatures may help to account for changes in oil viscosity and other temperature-dependent factors. Beneficial results of the adaptive methodology disclosed herein may include an improvement in overall shift feel and clutch durability.

In an example embodiment, the vehicle includes an engine, a first clutch, a transmission, and a controller. The transmission includes an input member that is selectively connectable to the output shaft of the engine via the first clutch. The transmission also includes a gearbox, first and second position sensors, and a fluid circuit. The gearbox may contain a second clutch or multiple such clutches. Each position sensor measures a corresponding position of a respective one of the first and second clutches. The fluid circuit includes a fluid pump and a solenoid valve, e.g., a flow control variable force solenoid (QVFS) valve, with the fluid pump circulating fluid under pressure to the valve for use by the particular clutch controlled via the valve whose flow performance is being evaluated.

In this example embodiment, the controller may selectively open the valve via flow control signals in the form of electrical current commands to thereby allow the fluid to flow into or out of the clutch. Execution of instructions by the controller causes the controller to receive the measured position signals from a selected one of the position sensors, e.g., in response to a requested shift. The controller then determines, from the received position signals, an actual flow rate through the valve as the clutch moves from a first calibrated position to a second calibrated position, and also calculates the compensation scale factor noted above as a ratio of the commanded flow rate to the actual flow rate. The controller then modifies the flow control signals for a subsequent actuation of the selected clutch using the calculated compensation scale factor, such as by multiplying a commanded flow rate corresponding to the flow control signals by the compensation scale factor to determine updated flow control signals.

The transmission may be embodied as a dual-clutch transmission (DCT) having a pair of input clutches as the first clutch. As is well known in the art of DCTs, one of the input clutches is applied to select oddly-numbered gears of the gearbox during a shift to an odd gear state, e.g., $1^{st}$, $3^{rd}$, or $5^{th}$ gear, and the other of the pair of input clutches is applied to select evenly-numbered gears of the gearbox during a shift to an even gear state such as $2^{nd}$ or $4^{th}$ gear.

The first and the second clutches may each have a respective clutch apply piston with a predetermined surface area. In such a design, the controller may calculate the actual flow rate through the valve as a function of the predetermined surface area of the clutch apply piston. Such information could be determined beforehand and recorded in memory of the controller as a calibration value.

The fluid circuit for the vehicle may also include a temperature sensor that measures a temperature of the fluid, for instance from a location within a fluid sump. The controller can record the compensation scale factor at different fluid temperatures for optimal performance. The controller may record the commanded flow rate, the actual flow rate, and the compensation scale factor at each temperature in a corresponding lookup table that is accessible by the controller.

A system is also disclosed herein. The system may include first and second rotatable members, for instance different shafts or axles of a powertrain, as well as a clutch that is operable for connecting the rotatable members together when the clutch is applied, and for disconnecting the rotatable members from each other when the clutch is released. The clutch in such a system may include a clutch apply piston. A position sensor measures a changing position of the clutch apply piston and outputs a set of measured position signals. The system includes a flow control solenoid valve that opens in response to flow control signals so as to allow fluid to pass into or from the clutch that is being fed by the valve, with the direction of flow depending on the flow control signals.

Additionally, a controller of the system adapts the flow control signals over time. By executing instructions embodying a method, for instance, the controller receives the set of measured position signals from the position sensor and determines, from the received set of measured position signals, an actual flow rate through the valve as the clutch apply piston moves from a first position to a second position. The controller also calculates a compensation scale factor as a ratio of the commanded flow rate and the actual flow rate, and then modifies the flow control signals in a subsequent actuation of the clutch using the compensation scale factor.

A method is also disclosed for use with a vehicle having an engine, a transmission, a clutch, a flow control solenoid valve, and a fluid pump operable for circulating fluid to the clutch via the flow control solenoid valve. The method includes receiving a set of position signals, via a controller, from a position sensor in response to a requested shift of the transmission, with the set of position signals describing a position of the clutch. The method includes determining, from the received set of position signals, an actual flow rate through the valve as the clutch moves from a first calibrated position to a second calibrated position. The controller then calculates a compensation scale factor as part of the method, doing so as a ratio of the commanded flow rate and the actual flow rate. The method further includes modifying the flow control signals for a subsequent actuation of the clutch using the calculated compensation scale factor.

The above features and advantages and other features and advantages of the present invention are readily apparent from the following detailed description of the best modes for carrying out the invention when taken in connection with the accompanying drawings.

DETAILED DESCRIPTION

Figure 1:
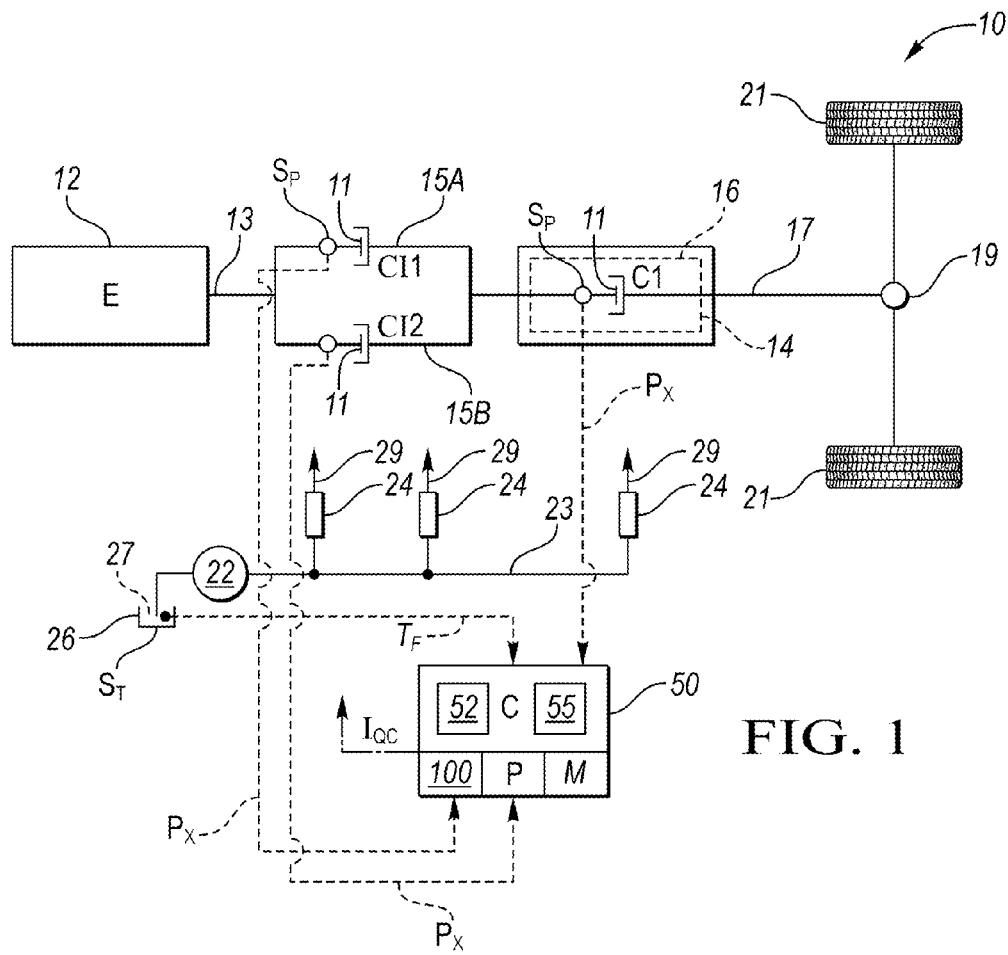
FIG. 1 is a schematic illustration of an example vehicle having a flow control valve and a controller that provides adaptive learning of actual flow performance characteristics of the flow control valve.

Referring to the drawings, wherein like reference numbers correspond to like or similar components throughout the several figures, a vehicle 10 is shown in FIG. 1. The vehicle 10 includes a fluid circuit 20 having a fluid pump 22 and one or more flow (Q) control solenoid valves 24. The valves 24 may be embodied as variable force flow control solenoid (QVFS) valves, which as is known in the art are responsive to electrical current signals so as to open and thereby pass pressurized fluid (arrow 29) at a desired flow rate. Such signals are indicated in FIG. 1 as arrow $I_{QC}$ from a controller (C) 50, the structure and function of which is discussed in detail below. The flow control valves 24 are connected to the fluid pump 22 by a suitable conduit 23, such as hoses, clamps, fittings, and the like.

The vehicle 10 includes various fluid powered components and control devices as explained below. The vehicle 10 therefore serves as a non-limiting example system suitable for use with a method 100 for adaptively learning the flow characteristics of the valve(s) 24. However, those of ordinary skill in the art will appreciate that the present invention is not limited to vehicular applications. Other possible systems may include, by way of example, hydraulic presses, conveyors, and lifts typically used on a plant floor, provided any of these systems includes a hydraulic device that is actuated via a piston or other movable actuator whose position can be measured and controlled.

In all embodiments, the controller 50 of FIG. 1 is in communication with the fluid circuit 20. Position sensors ($S_P$) are disposed within the vehicle 10 as shown. Measured position signals ($P_X$) are output from the position sensors $S_P$ and transmitted to the controller 50, for instance over a controller area network bus, serial bus, or other suitable connection, and used in the execution of the method 100. An example embodiment of the method 100 is described below with reference to FIG. 3.

Figure 2:
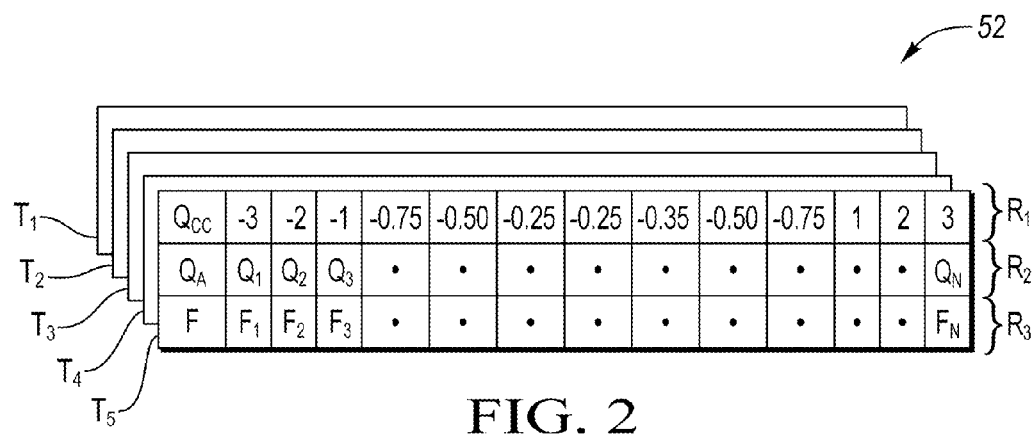
FIG. 2 is an example set of lookup tables usable by the controller of FIG. 1.

As part of the method 100, the controller 50, using a processor (P) and memory (M), periodically updates a set of lookup tables (LUT) 52, an example of which is shown in FIG. 2. Using the information recorded in the lookup tables 52, the controller 50 ultimately derives and adapts the underlying commanded flow rate corresponding to flow control signals ($I_{QC}$), with the term "adapts" indicating the changing nature of the flow control signals ($I_{QC}$) over time to match the actual performance of the valve 24.

In a possible configuration, the vehicle 10 of FIG. 1 may include an internal combustion engine (E) 12 and a transmission (T) 14, for instance a dual-clutch transmission (DCT) as shown having a first and a second input clutch CI1 and CI2, respectively. Only one input clutch may be used in an alternative automated manual transmission (AMT). The transmission 14 includes an output member 17 that delivers output torque from the transmission 14 to the drive wheels 21 of the vehicle 10, e.g., via a differential 19.

Additionally, a temperature sensor $S_T$ may be positioned in a fluid sump 26 of the fluid circuit 20, with a fluid sump 26 containing a volume of fluid 27, e.g., oil or transmission fluid. A portion of this fluid 27, once circulated under pressure via the pump 22, is ultimately discharged via the valves 24 as the pressurized fluid (arrows 29). The temperature sensor $S_T$, which is in electrical communication with the controller 50, may periodically or continuously transmit a measured fluid temperature ($T_F$) to the controller 50 for use in control of the valves 24. The controller 50 may receive other signals as part of its overall control function within the vehicle 10.

The controller 50 of FIG. 1 may be embodied as a host computer device that includes elements such as the processor (P), the memory (M) including but not limited to read only memory (ROM), random access memory (RAM), electrically-programmable read-only memory (EPROM), flash memory, etc., and the required hardware devices 55. Hardware devices 55 may include a high-speed clock (not shown), timers for use in the execution of certain steps of the method 100, analog-to-digital (A/D) circuitry, digital-to-analog (D/A) circuitry, a digital signal processor (DSP), and input/output (I/O) devices and/or other signal conditioning and/or buffer circuitry.

Within the transmission 14, a gear box 16 may contain another clutch C1, for instance a friction clutch or a clutch synchronizer. For simplicity, only one additional clutch C1 is shown in the schematic view of FIG. 1. However, in an actual embodiment, any number of clutches and/or synchronizers may be used. The description provided herein with respect to the clutch C1 of transmission 14 therefore applies to any position-controlled clutch used in the transmission 14 or outside of the transmission 14, e.g., the input clutches CI1 and CI2.

The clutches CI1, CI2, and C1 may each utilize a respective one of the position sensors $S_P$, positioned with respect to a clutch apply piston 11, with engagement of each input clutch CI1, CI2 in a non-limiting DCT embodiment respectively selecting only the oddly-numbered or evenly-numbered gears of the transmission 14. As is known in the art, such a configuration allows the connection of an output shaft 13 of the engine 12 to such selected gears. That is, the transmission 14 may have an input member 15A, 15B, with the input member 15A being the oddly-numbered gear shaft and input member 15B being the evenly-numbered gear shaft, as is known in the art of DCTs. The specific rotatable members that are selectively connected and disconnected via engagement of a given clutch, e.g., CI1, CI2, or C1, may vary from those shown in FIG. 1, i.e., the output shaft 13 or input members 15A, 15B, without departing from the intended inventive scope.

The example clutches CI1, CI2, and C1 are in fluid communication with the fluid pump 22, and therefore are supplied with fluid 27 under pressure as needed to actuate the clutches CI1, CI2, and/or C1. The fluid 27 flows through the valve(s) 24 whenever the valves 24 are opened in response to receipt by the valves 24 of the flow control signals ($I_{QC}$) from the controller 50. Such commands may be, as noted above, embodied as electrical current control signals transmitted to the valve(s) 24, e.g., a commanded current level needed for energizing the coil (not shown) of any solenoid portion of the valves 24 so as to open the valves 24 in a typical normally-off valve design.

As one of its intended functions, the controller 50 of FIG. 1 executes the instructions embodying the method 100 to thereby reduce the effects of variation in output flow from the valves 24 over time with respect to expected values. This in turn may help to reduce variation in clutch position and clutch torque, and ultimately improve overall shift quality. As is known in the art, conventional QVFS valves are provided with a characteristic flow/current (Q v. i) characteristic curve that is valid at a given pressure and temperature, typically as seen during steady-state operating conditions. However, variation from the values in a calibrated Q v. i characteristic curve may result at other pressures, temperatures, and/or due to age or wear of the valves 24. To address this problem, the controller 50 of the present invention periodically learns the true output flow performance characteristics of the valves 24 and then adjusts the values in the lookup tables 52 in the manner set forth below so as to compensate for such variation, thereby creating a closer match between expected and actual performance.

Referring to FIG. 2, in an example embodiment the lookup tables 52 may include first, second, and third rows R1-3. The first row R1 captures a commanded flow rate ($Q_{CC}$) underlying the flow control signals ($I_{QC}$) of FIG. 1. This value is shown nominally in an example range of −3 to +3, for instance in liters per minute or another suitable flow rate. The actual values in the first row R1 will vary depending on the design of the valve 24. In this instance, a negative flow, for instance −3, refers to an outflow of fluid 27 from the clutches CI1, CI2, or C1 of FIG. 1, such as might occur when exhausting fluid 27 from the clutch CI1, CI2, or C1.

The second row R2 may be populated with corresponding actual flow rates $Q_A$, which as noted above may vary over time from the commanded flow rate $Q_{CC}$ of the first row R1. The values in the second row R2 are shown as $Q_1, Q_2, Q_3, \ldots, Q_N$ for illustrative simplicity. The actual values recorded in the second row R2 may be calculated by the controller 50, for instance using the following equation:

$$Q_A = \left(\left(\frac{(P1-P2)}{t_1}\right) \cdot \left(\frac{A}{1000000}\right) \cdot 60\right)$$

where P1 and P2 are the measured positions of the clutch CI1, CI2, or C1, or more precisely of the clutch apply piston 11 thereof, as determined via the position signals $P_X$ for a corresponding position sensor $S_P$ for that clutch, A is the predetermined surface area of the same clutch apply piston 11, and $t_1$ is a timer value indicating the elapsed time between the transition between positions P1 and P2. The actual flow rate $Q_A$ in other embodiments may be determined differently, for example using a flow meter, without departing from the intended inventive scope.

Multiple lookup tables 52 may be created for different temperatures in some embodiments, with the different temperatures indicated as T1, T2, T3, T4, and T5 in the example five-table embodiment of FIG. 2. In such an embodiment, multiple lookup tables 52 may be recorded in memory M of the controller 50 shown in FIG. 1. More than five lookup tables 52 may be used in other embodiments, while fewer than five lookup tables 52 may also be used. This way, the lookup table closest in temperature to the actual temperature at the time of the analysis can be used to minimize error, or values from multiple lookup tables 52 can be used to extrapolate a final value for use in the method 100. A sufficiently large number of lookup tables 52 should be used so as to cover a useful range of likely temperatures, such as the five tables for temperatures T1 T2, T3, T4 and T5 as shown in FIG. 2.

The controller 50 of FIG. 1 uses the data in the respective first and second rows R1 and R2 of the lookup tables 52 to create a compensation scale factor F, and records this value in the third row R3, as indicated by the nominal scale factors $F_1, F_2, F_3, \ldots, F_N$. The compensation scale factor F as used herein is a calculated ratio of the commanded flow rate $Q_{CC}$ to the actual flow rate, i.e., $$F = \frac{Q_{CC}}{Q_A}.$$

Using the compensation scale factor F, the controller 50 can readily adjust the commanded flow rate $Q_{CC}$ from a prior application of one of the clutches CI1, CI2, or C1 via the recorded compensation scale factor F, with the result being to a new or adapted value for the flow control signals ($I_{QC}$) of FIG. 1. Because this process is iterative, the controller 50 periodically updates the lookup tables 52 based on the calculated or measured actual flow $Q_A$, a value which may change over time, to thereby ensure control accuracy of the valves 24.

Figure 3:
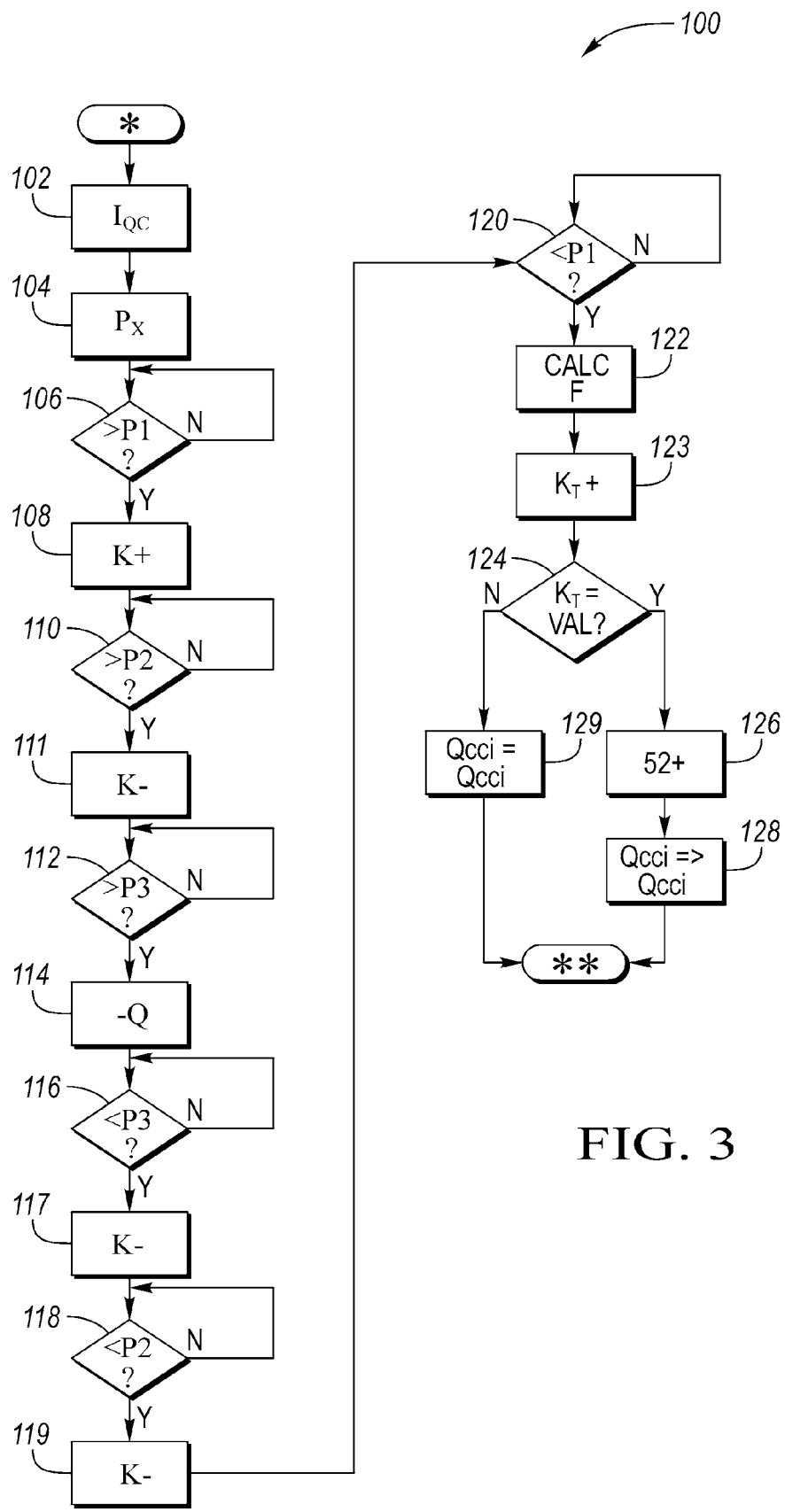
FIG. 3 is a flow chart describing an example method for learning the flow performance of the flow control valve shown in FIG. 1.

Referring to FIG. 3, an example embodiment of the method 100 begins at step 102, wherein the controller 50 commands a positive flow rate from the valve 24 of FIG. 1 via an initial set of flow control signals ($I_{QC}$). Step 102 may be executed in response to a request for such flow, for instance by a driver of the vehicle 10 of FIG. 1 when the driver requests a shift of the transmission 14 via throttle and/or braking action requiring the application or release of any of the clutches CI1, CI2, or C1. The method 100 then proceeds to step 104.

Step 104 entails receiving the measured position signals $P_X$ from the position sensors $S_P$ of the particular clutch, the valve 24 for which whose performance is being evaluated in the present control loop. This value may be temporarily stored in memory M. The method 100 then proceeds to step 106.

At step 106, the controller 50 of FIG. 1 next determines, from the received measured position signals $P_X$ of step 105, whether the clutch whose valve 24 is being evaluated has reached a first calibrated position (P1). If the first calibrated position (P1) has been attained, the method 100 proceeds to step 108. The method 100 otherwise repeats step 106.

At step 108, the controller 50 starts a timer (K+), which may be included as part of the hardware 55 of the controller 50 as shown in FIG. 1. As noted above with reference to FIG. 2, the time of transition between calibrated positions may be used to calculate the actual flow rate $Q_A$ for recording in each of the lookup tables 52, and therefore the timer steps of FIG. 3 are important to this calculation. The method 100 proceeds to step 110 when the timer has started.

Step 110 may entail determining, from the received measured position signals $P_X$, whether the clutch whose valve 24 is being evaluated has reached a second calibrated position (P2). If so, the method 100 proceeds to step 111. The method 100 otherwise repeats step 110 while the timer continues counting.

At step 111, the controller 50 stops the timer that was previously initiated at step 108 before proceeding to step 112. The value of the counter in the transition between points P1 and P2 may be recorded in memory M for use in calculating the actual flow rate $Q_A$ for lookup tables 52 of FIGS. 1 and 2.

Step 112 entails determining, from the received measured position $P_X$, whether the clutch being evaluated has attained a third calibrated position (P3). If not, the method 100 repeats step 112. Otherwise, the method 100 proceeds to step 114.

At step 114, the controller 50 commands a negative flow rate from the valve 24 of the clutch being evaluated, doing so in response to the determination at step 112 that the clutch CI1, CI2, or C1 has reached the third calibrated position (P3). That is, to arrive at step 114, the controller 50 first determines at steps 106 and 110 that the clutch has passed the first and second position thresholds P1 and P2, respectively, and is thus being fully applied. However, step 112 determines that the clutch has moved beyond the second calibrated position (P2) to the third calibrated position (P3). In response to this, the controller 50 may command an outflow of fluid 27 from the clutch so as to move the clutch, or rather its clutch apply piston, back in the direction of the second calibrated position (P2). After commanding such an outflow, the method 100 proceeds to step 116.

Step 116 may entail determining whether the clutch position, from the measured position signals $P_X$, has changed and is now less than the third calibrated position P3, i.e., the clutch apply piston 11 for the clutch being evaluated is presently located between the second and the third calibrated positions P2 and P3. If this is the case, the method 100 proceeds to step 117, with the method 100 instead repeating step 116 if the position has not yet changed as expected.

Step 117 involves initiating the timer from zero anew before proceeding to step 118.

At step 118, the controller 50 of FIG. 1 next determines if the position of the clutch CI1, CI2, or C1, which was previously commanded by the controller 50 to approach the second position P2 by the negative flow (−Q) commanded at step 114, has in fact reached the second calibrated position P2. If so, the method proceeds to step 119. Otherwise, the controller 50 repeats step 118.

At step 119, the timer that was previously started again at step 117 is now stopped (K−). The elapsed time of the move from the third threshold position P3 back to the second threshold position P2 is recorded in memory M of the controller 50. The method 100 thereafter proceeds to step 120.

Step 120 may include determining if the clutch being evaluated has moved to below the first threshold position (P1), i.e., to a position between fully exhausted and the first calibrated position (P1). If not, the method 100 repeats step 120 and continues to exhaust pressure from the clutch. The method 100 proceeds to step 122 once the clutch being evaluated has moved past the first threshold position (P1).

At step 122, the controller 50 of FIG. 1 next calculates the compensation scale factor F for the positive and negative flow rates that occurred in the execution of steps 102-120. As explained above with reference to FIG. 2, calculation of the compensation scale factor F involves the use of the data recorded in the lookup tables 52, i.e., commanded and actual flow rates $Q_{CC}$ and $Q_A$, respectively, through the filling or emptying of the clutch CI1, CI2, or C1. The method 100 proceeds to step 123 when this step is complete.

Step 123 may optionally include incrementing a test counter ($K_T^+$). Such a test counter, also available as part of the hardware 55 shown in FIG. 1, may be tied to how many pairs of test flow rates are commanded during testing. For example, in the lookup tables 52 shown in FIG. 2 there are seven (7) pairs of commanded flow rates, i.e., [−3, 3], [−2, 2], [−1, 1], [−0.75, 0.75], [−0.50, 0.50], [−0.35, 0.35], and [−0.25, 0.25], which in this example represents commanded flow rates ($Q_{CC}$) in liters per minute. The actual number of test pairs may vary with the design depending on the level of granularity that is desired, and the flow rates may likewise vary depending on the design of the transmission 14. The method 100 then proceeds to step 124.

At step 124, the controller 50 of FIG. 1 next determines whether the count of the test counter incremented at step 123 indicates that a given pair of commanded flow rates has been tested, i.e., $K_T$=VAL? The method 100 proceeds to step 126 if a given pair has been tested. Alternatively, the method 100 may proceed to step 126 only if all seven flow rates pairs have been tested, although once a pair has been tested, that particular flow rate may be adapted for the next shift of the transmission 14 requiring that flow rate. The method 100 proceeds instead to step 129 if a given pair of commanded flow rates has not been tested.

At step 126, the controller 50 updates the lookup tables 52 of FIGS. 1 and 2, as indicated by 52+ in FIG. 3, using the data determined in the execution of steps 102-124, and after resetting the test timer for the particular pair of commanded flow rates whose test has been completed, thereafter proceeds to step 128.

Step 128 entails applying the compensation scale factor F to the commanded flow $Q_{CC}$ from the last application of the clutch CI1, CI2, or C1, indicated as $Q_{CCi}$ for an initial use of the method 100, such $Q_{CCi}$ for the initial or an immediately prior shift action involving a particular commanded flow rate is set equal to the adapted commanded flow rate, as abbreviated by $Q_{CCi}$=$Q_{CC}$ in FIG. 3. This step allows the flow control signals ($I_{QC}$) transmitted from the controller 50 to the valve 24, upon the next application of a clutch controlled by the valve 24, to be adjusted or adapted upward or downward as needed via the compensation scale factor F.

The compensation scale factor F may be further limited by calibration values, and set to 1 when the learning process enabled by method 100 is not complete for a given commanded flow rate pair or temperature region. Likewise, the commanded flow rate ($Q_{CC}$) may remain limited to levels allowed by any calibrated flow command limit tables of the controller 50. The method 100 is then completed (**) for one control loop, repeating anew at step 102. The method 100 therefore runs continuously, updating the lookup tables 52 over time in the background of any existing clutch control logic in a non-intrusive and computationally simple approach.

Step 129 may include using the prior value for the commanded flow rate ($Q_{CCi}$) in the next use of the evaluated clutch. This decision is made based on a determination at step 124 that the test counter did not indicate that an affected pair of commanded flow rates, e.g., [−3, 3] LPM, has been completely tested. The method 100 is then completed () for one control loop, repeating anew at step 102**.

Using the method 100 and controller 50 as described above, a vehicle such as the vehicle 10 of FIG. 1 or any other fluidic system using a positioned-controlled clutch apply piston may enjoy certain performance improvements. Current technology is to characterize flow versus solenoid current of a flow control solenoid valve at a single pressure and temperature, with this information provided via a supplier of the valve as noted above. The present invention as described above instead provides a nonintrusive, computationally efficient way to periodically characterize the actual output flow rate and adjust a commanded flow rate via the lookup tables 52 of FIG. 2 so as to compensate for flow variation over time. The result should be a more predictable output flow from a given valve 24. In turn, the improved accuracy in output flow control should result in an improved quality or feel of the particular fluid powered action that is being controlled, whether that is a shift of the transmission 14 in the example vehicle 10 of FIG. 1 as described above or any other action of a positioned-controlled fluidic device.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine having an output shaft;
a first clutch;
a transmission having:
an input member that is selectively connectable to the output shaft of the engine via the first clutch;
a gearbox containing a second clutch;
a first and a second position sensor, each of which is configured to measure a position of a respective one of the first and second clutches and output a corresponding measured position; and
a fluid circuit having a fluid pump and a flow control solenoid valve, wherein the fluid pump circulates a fluid to the valve; and
a controller in electrical communication with the valve, and configured to selectively open the valve via a flow control signal to thereby allow the fluid to pass into or from the clutch, wherein execution of instructions by the controller causes the controller to:
receive the measured position signals from a selected one of the first and second position sensors in response to a requested shift;
determine, from the received measured position signals, an actual flow rate through the valve as the clutch moves from a first position to a second position;
calculate a compensation scale factor as a ratio of a commanded flow rate and the actual flow rate; and
modify the flow control signals for a subsequent actuation of the selected clutch using the compensation scale factor.

2. The vehicle of claim 1, wherein the flow control valve is a variable force solenoid (QVFS) valve, and wherein the controller transmits the flow control signals to the QVFS valve as a commanded electrical current.

3. The vehicle of claim 1, wherein the transmission is a dual-clutch transmission (DCT) having a pair of input clutches as the first clutch, with one of the pair of input clutches being applied to select oddly-numbered gears of the gearbox during a shift to an odd gear state, and the other of the pair of input clutches being applied to select evenly-numbered gears of the gearbox during a shift to an even gear state.

4. The vehicle of claim 1, wherein the first and the second clutches each has a clutch apply piston with a predetermined surface area, and wherein the controller calculates the actual flow rate as a function of the predetermined surface area of the clutch apply piston.

5. The vehicle of claim 1, further comprising a temperature sensor positioned in the fluid circuit in electrical communication with the controller, wherein the temperature sensor measures a temperature of the fluid, and wherein the controller records the compensation scale factor at a plurality of different fluid temperatures.

6. The vehicle of claim 1, wherein the controller is operable to record the commanded flow rate, the actual flow rate, and the compensation scale factor in a lookup table that is accessible by the processor.

7. The vehicle of claim 6, further comprising a temperature sensor positioned in the fluid circuit in electrical communication with the controller, wherein the temperature sensor measures a temperature of the fluid, and wherein the controller records a plurality of the lookup tables, with one of the lookup tables corresponding to a respective one of a plurality of different measured fluid temperatures.

8. A system for use with a fluid pump, the system comprising:
a first rotatable member;
a second rotatable member;
a clutch operable for connecting the first and second rotatable members together when the clutch is applied, and for disconnecting the first and second rotatable members from each other when the clutch is released, wherein the clutch includes a clutch apply piston;
a position sensor configured to measure a position of the clutch apply piston when the clutch is applied or released, and to output a measured position signal;
a flow control solenoid valve configured to selectively open or close in response to flow control signals; and
a controller having a processor and tangible, non-transitory memory on which is recorded instructions for adapting the flow control signals over time, wherein execution of the instructions by the processor causes the controller to:
receive the measured position signal from the position sensor;
determine, from the received measured position signal, an actual flow rate of a fluid from the fluid pump through the valve as the clutch apply piston moves from a first position to a second position;
calculate a compensation scale factor as a ratio of a commanded flow rate and the actual flow rate; and
modify the flow control signals for a subsequent actuation of the selected clutch using the compensation scale factor.

9. The system of claim 8, wherein the flow control valve is a variable force solenoid (QVFS) valve, and wherein the controller transmits the flow control signals to the QVFS valve as a commanded electrical current.

10. The system of claim 8, wherein the clutch apply piston has a predetermined surface area, and wherein the controller is programmed to calculate the actual flow rate as a function of the predetermined surface area of the clutch apply piston.

11. The system of claim 8, further comprising a temperature sensor in electrical communication with the controller, wherein the temperature sensor measures a temperature of the fluid, and wherein the controller records the compensation scale factor at a plurality of different fluid temperatures.

12. The system of claim 8, wherein the clutch is an input clutch of a vehicle having an engine and a transmission, and wherein the input clutch, when applied, connects the engine to the transmission.

13. The system of claim 8, wherein the controller is programmed to record the commanded flow rate, the actual flow rate, and the compensation scale factor in a lookup table that is accessible by the processor.

14. The system of claim 13, further comprising a temperature sensor positioned in the fluid circuit in electrical communication with the controller, wherein the temperature sensor measures a temperature of the fluid, and wherein the controller records a plurality of the lookup tables, with one of the lookup tables corresponding to a respective one of a plurality of different measured fluid temperatures.

15. A method for use with a vehicle having an engine, a transmission, a clutch, a flow control solenoid valve, and a fluid pump operable for circulating fluid to the clutch via the flow control solenoid valve, the method comprising:

receiving a measured position signal, via a controller, from a position sensor in response to a requested shift of the transmission, wherein the measured position signal describes a measured position of the clutch;
  determining, from the received measured position signal, an actual flow rate through the valve as the clutch moves from a first calibrated position to a second calibrated position;
  calculating, via the controller, a compensation scale factor as a ratio of a commanded flow rate of the valve and the actual flow rate; and
  modifying flow control signals for the valve for a subsequent actuation of the selected clutch using the compensation scale factor.

16. The method of claim 15, wherein the clutch has a clutch apply piston with a predetermined surface area, and wherein determining the actual flow rate includes calculating the actual flow rate using the predetermined surface area of the clutch apply piston.

17. The method of claim 15, wherein the vehicle includes a temperature sensor, further comprising measuring a temperature of the fluid via the temperature sensor, and recording the compensation scale factor at a plurality of the measured fluid temperatures.

18. The method of claim 15, further comprising recording the commanded flow rate, the actual flow rate, and the compensation scale factor in a lookup table.

\* \* \* \* \*